R. Collier,
Egg-Beater,
№ 16,267. Patented Dec. 23, 1856.

UNITED STATES PATENT OFFICE.

RALPH COLLIER, OF BALTIMORE, MARYLAND, ASSIGNOR TO HIMSELF AND ALFRED H. REIP.

ROTARY EGG-BEATER.

Specification of Letters Patent No. 16,267, dated December 23, 1856.

*To all whom it may concern:*

Be it known that I, RALPH COLLIER, of the city of Baltimore, in the State of Maryland, have invented a certain new and useful Rotary Egg-Beater; and I hereby declare that the following is a full, clear, and exact description thereof, reference being had to the accompanying drawings, making part of this specification, in which—

Figure 2:
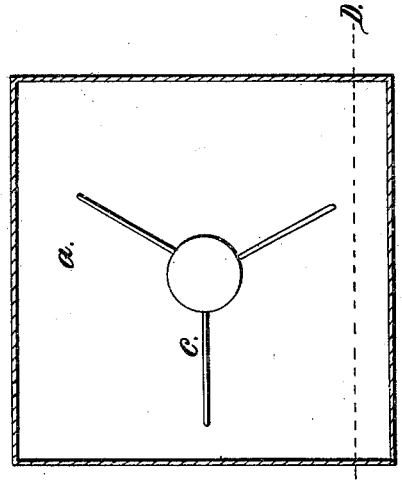
Figure 1:
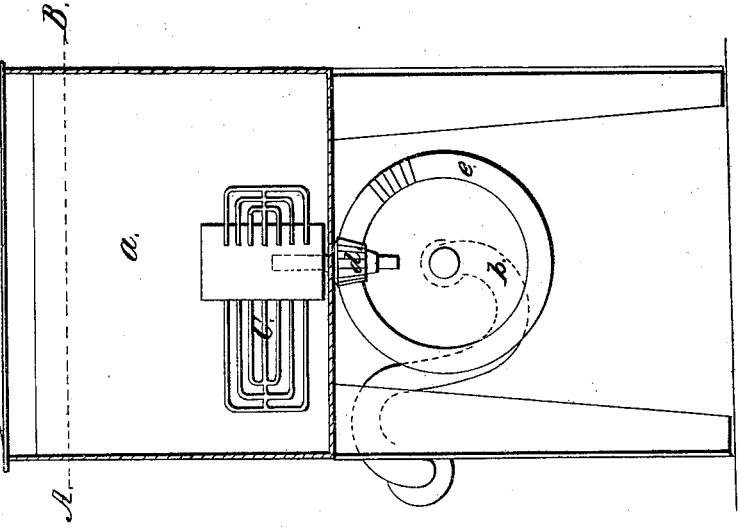

Figure 1 is a vertical section in the line C—D and Fig. 2 a horizontal section in the line A—B.

The letters of reference indicate the same parts in the different figures.

The beating of eggs is a common operation in every household, more particularly in hotels, and restaurants where eggs are used as a principal constituent in the preparation of many dishes but in a form less injurious to health than in their raw or coagulated state. Eggs prepared by beating are thoroughly charged with atmospheric air, and would on account of their comparative easy digestion in this form, be used so, much more than they are, were it not for the laborious, and fatiguing operation of beating the eggs by hand, which is usually performed with a fork or hand beater made for the purpose, by imparting to it a regular rotatory motion passing alternately through the eggs and through the air. The air is thus drawn into, and incorporated with the mass in small quantities, requiring thus a long and tedious manipulation, to accomplish the complete charging of the eggs with air.

To facilitate the above operation I have constructed a simple and uncomplicated machine that will do the work in a more efficacious manner and with little expense of time and labor.

The following is a description of the construction and operation of the machine. The white of the eggs, being collected in the vessel $a$, the crank $b$, is set in motion, which communicates an accelerated motion to the agitators $c$ by means of the bevel pinion $d$, and bevel wheel $e$. The agitators or stirring paddles $c$, are made of small but rigid wire, leaving by far the larger portion of the surface open. These produce a very powerful effect. The wires traversing the mass furrow it in regular circular layers, leaving behind them a vacuum that is immediately filled up with fresh air, that is drawn into a whirl-pool and intimately diffused through the whole mass. The whirlpool or vortex is caused by the fact of the wire work being denser the nearer it approaches the central axis, it is evident that the effect increases from the circumference toward the center and the surface of the liquid will become conical, the apex downward at the center.

What I claim as my invention and desire to secure by Letters Patent is—

Vertically revolving stirring blades made of metallic wire, arranged as herein described and when attached to a central shaft, operated in the manner set forth.

In testimony whereof I have signed my name to this specification before two subscribing witnesses.

RALPH COLLIER.

Witnesses:
 JOHN S. HOLLINGSHEAD,
 CHAS. EVERETT.